(12) United States Patent
Onogi et al.

(10) Patent No.: US 7,854,442 B2
(45) Date of Patent: Dec. 21, 2010

(54) BICYCLE WIRE HOLDING ARRANGEMENT (75) Inventors: Takumi Onogi, Osaka (JP); Akinobu Uno, Kyogo (JP)

(73) Assignee: Shimano Inc., Osaka (JP)

( * ) Notice: Subject to any disclaimer, the term of this patent is extended or adjusted under 35 U.S.C. 154(b) by 228 days.

(21) Appl. No.: 12/201,068

(22) Filed: Aug. 29, 2008

(65) Prior Publication Data
US 2010/0051758 A1 Mar. 4, 2010

(51) Int. Cl.
B62K 3/02 (2006.01)
(52) U.S. Cl. .................. 280/288.3; 280/281.1; 74/487; 74/489
(58) Field of Classification Search ............. 280/288.3, 280/281.1; 74/487, 489
See application file for complete search history.

(56) References Cited

U.S. PATENT DOCUMENTS

| | | | |
|---|---|---|---|
| 4,102,219 A | | 7/1978 | Plamper |
| 4,678,054 A | * | 7/1987 | Honda et al. ................ 180/225 |
| 4,900,048 A | * | 2/1990 | Derujinsky ............. 280/281.1 |
| 4,966,047 A | * | 10/1990 | Krauer et al. .............. 74/502.2 |
| 5,478,100 A | * | 12/1995 | McDermitt et al. ...... 280/281.1 |
| 5,626,058 A | * | 5/1997 | Karpowich et al. ........... 74/489 |
| 6,220,398 B1 | * | 4/2001 | Wu .......................... 188/24.11 |
| 7,114,738 B1 | | 10/2006 | Chen |
| 7,147,238 B2 | * | 12/2006 | Oi ............................ 280/281.1 |
| 7,562,889 B2 | * | 7/2009 | Cauwet ...................... 280/276 |
| 7,566,065 B2 | * | 7/2009 | Fukui ...................... 280/281.1 |
| 2004/0104314 A1 | | 6/2004 | Harrison et al. |
| 2004/0188976 A1 | * | 9/2004 | Schmider ................... 280/279 |
| 2004/0262065 A1 | | 12/2004 | Horiuchi |
| 2005/0057017 A1 | * | 3/2005 | Hara et al. .................. 280/279 |
| 2005/0258617 A1 | | 11/2005 | Ueno et al. |
| 2006/0254381 A1 | | 11/2006 | Chamberlain |
| 2008/0154531 A1 | | 6/2008 | Watarai et al. |
| 2008/0179858 A1 | | 7/2008 | Chen |

FOREIGN PATENT DOCUMENTS

| | | |
|---|---|---|
| BE | 1013281 A7 | 11/2001 |
| DE | 35 23-158 C1 | 5/1987 |
| JP | 2000-302074 A | 10/2000 |

OTHER PUBLICATIONS

Extended European Search Report for corresponding EP Application No. 09 15 8396.3 dated Jun. 25, 2010.

* cited by examiner

Primary Examiner—Lesley Morris
Assistant Examiner—Marlon A Arce
(74) Attorney, Agent, or Firm—Global IP Counselors, LLP (57) ABSTRACT A bicycle wire holding arrangement is provided with a hollow frame member, a wire extending axially inside the hollow frame member and a suspending member disposed inside the hollow frame member. The suspending member is coupled to the wire and contacts an interior surface of the hollow frame member to hold the wire.

9 Claims, 9 Drawing Sheets

BICYCLE WIRE HOLDING ARRANGEMENT

BACKGROUND OF THE INVENTION

1. Field of the Invention

This invention generally relates to a bicycle wire holding arrangement. More specifically, the present invention relates a bicycle wire holding arrangement that holds a wire within a hollow frame member to minimize noise from the wire moving within the hollow frame member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Specifically, in recent years, bicycles have been provided with various electric devices to improve rider efficiency and/or component control.

For example, some bicycles are provided with a hub dynamo and/or a battery to power various electrical components such as electric shifters, electric derailleurs, lamps and the like. Also some bicycles are provided with an electronic control system that includes a main cycle computer, one or more sensors, one or more control switches, and electrical cords (wires) for electrical communications between the various electrical components such as electric shifters, electric derailleurs, lamps and the like.

Typically, the electrical cords (wires) connecting the various electrical components are attached to run along the exterior surface of the frame of the bicycle. As more electrically components are added to the bicycle, the number of electrical cords (wires) increases. This arrangement can result in the bicycle frame being cluttered with electrical cords extending along the frame. Thus, it has been proposed to run the electrical cords inside of the bicycle frame. However, with this arrangement, the electrical cords inside of the bicycle frame can move around and make undesirable noises.

In view of the above, it will be apparent to those skilled in the art from this disclosure that there exists a need for an improved bicycle wire holding arrangement that holds a wire within a hollow frame member. This invention addresses this need in the art as well as other needs, which will become apparent to those skilled in the art from this disclosure.

SUMMARY OF THE INVENTION

One object of the present invention is to provide a bicycle wire holding arrangement that holds a wire within a hollow frame member to minimize noise from the wire moving within the hollow frame member.

The foregoing objects can basically be attained by providing a bicycle wire holding arrangement that comprises a hollow frame member, a wire extending axially inside the hollow frame member and a suspending member disposed inside the hollow frame member. The suspending member is coupled to the wire and contacts an interior surface of the hollow frame member to hold the wire.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
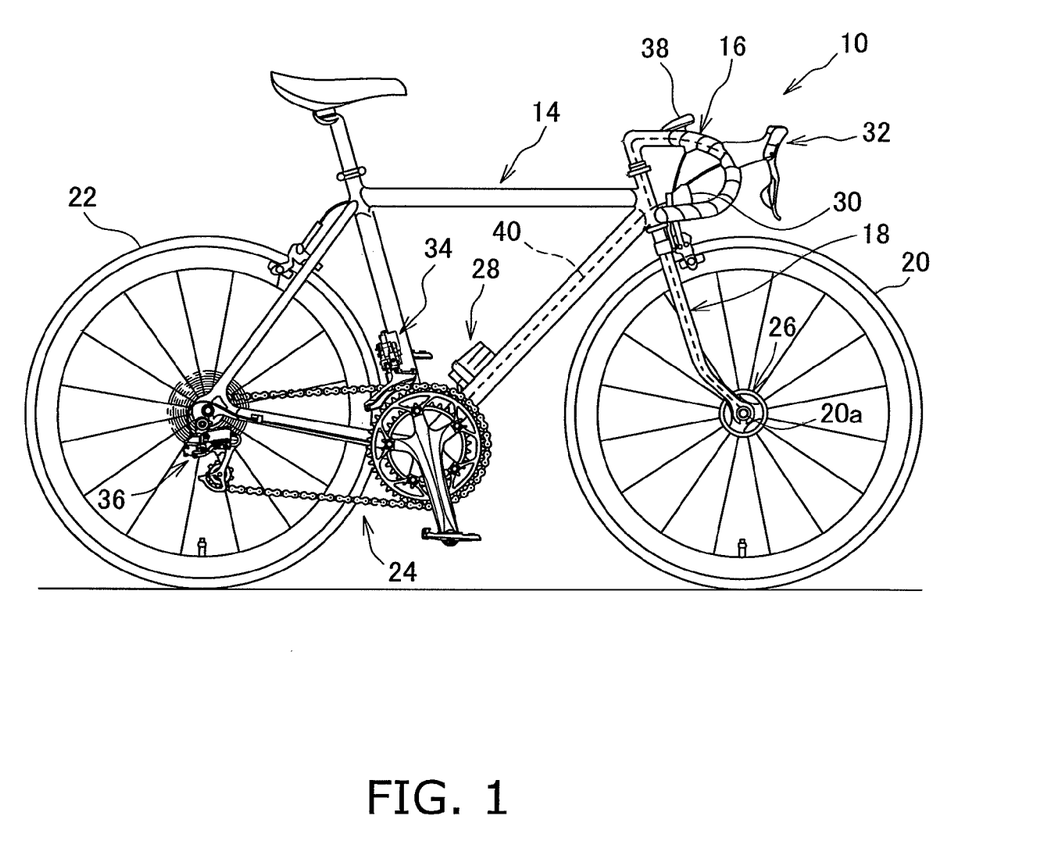
FIG. 1 is a side elevational view of a bicycle having a plurality of electrical components that are connected by electrical cords (wires) in which a bicycle wire holding arrangement is used in accordance with a first embodiment.

Referring initially to FIG. 1, a bicycle 10 is illustrated that is equipped with a bicycle wire holding arrangement 12 in accordance with a first embodiment. Basically, the bicycle 10 includes a frame 14, a handlebar 16, a front fork 18, a front wheel 20, a rear wheel 22 and a drive section 24 (a chain, pedals, etc.). The frame 14 constitutes a body framework of the bicycle 10. The front fork 18 is connected in a freely rotatable manner to a front end portion of the frame 14 in a conventional manner. The front fork 18 basically has a pair of fork blades 18a, a fork crown 18b, and a fork stem 18c. The two fork blades 18a are arranged on both sides of the front wheel 20 with the tip end portions of the fork blades 18a being connected to a front hub axle 20a of the front wheel 20. The fork crown 18b is connected to the upper end portions (i.e., opposite ends from the tip end portions) of the fork blades 18a. The fork stem 18c is fixedly connected to the fork crown 18b, and is arranged to extend upwardly from the fork crown 18b. The fork stem 18c is supported on the front end portion of the frame 14 in a freely rotatable manner. The free end of the fork stem 18c has the handlebar 16 fixedly connected thereto for steering the front wheel 20.

The bicycle 10 is also equipped with various electrical bicycle components such as a hub dynamo 26, a battery 28, a lamp 30, a pair of electric shifters 32, a front motorized derailleur 34, a rear motorized derailleur 36 and a cycle computer 38. The hub dynamo 26 and the battery 28 form an electric power supply system that is electrically connected to the bicycle components 30, 32, 34, 36 and 38 by an electrical wiring harness 40. In this illustrated embodiment, the electric shifters 32 and the motorized derailleurs 34 and 36 form an electrically controlled shifting system.

Electric power supply systems and electrically controlled shifting systems are known in the bicycle field, and thus, they will not be discussed in detail herein. For example, in the electrically controlled shifting system of the illustrated embodiment, the electric shifters 32 electronically control the motorized derailleurs 34 and 36 to change the position of a chain relative to front and rear chain sprockets of the bicycle 10 in a conventional manner. The hub dynamo 26 supplies electrical power to the battery 28 via the electrical wiring harness 40, and the battery 28 supplies electrical power to the bicycle components 30, 32, 34, 36 and 38 by an electrical wiring harness 40.

The electrical wiring harness 40 is formed of a plurality of electrical cords and/or electrical wires that electrically connects the bicycle components 26, 28, 30, 32, 34, 36 and 38 together. The precise construction of the electrical wiring harness 40 will depend upon the configuration of the electrical bicycle components such as the bicycle components 26, 28, 30, 32, 34, 36 and 38. Thus, details of the electrical wiring harness 40 will not be discussed and/or illustrated herein. Moreover, the term "wire" as used herein generically refers to both a single electrical conductor (insulated or bare) and an electrical cord or cable with one or more electrical conductor (insulated and/or bare). Furthermore, the term "wire" as used herein can also include a non-electrical wire, a non-electrical cord or a non-electrical cable.

Figure 2:
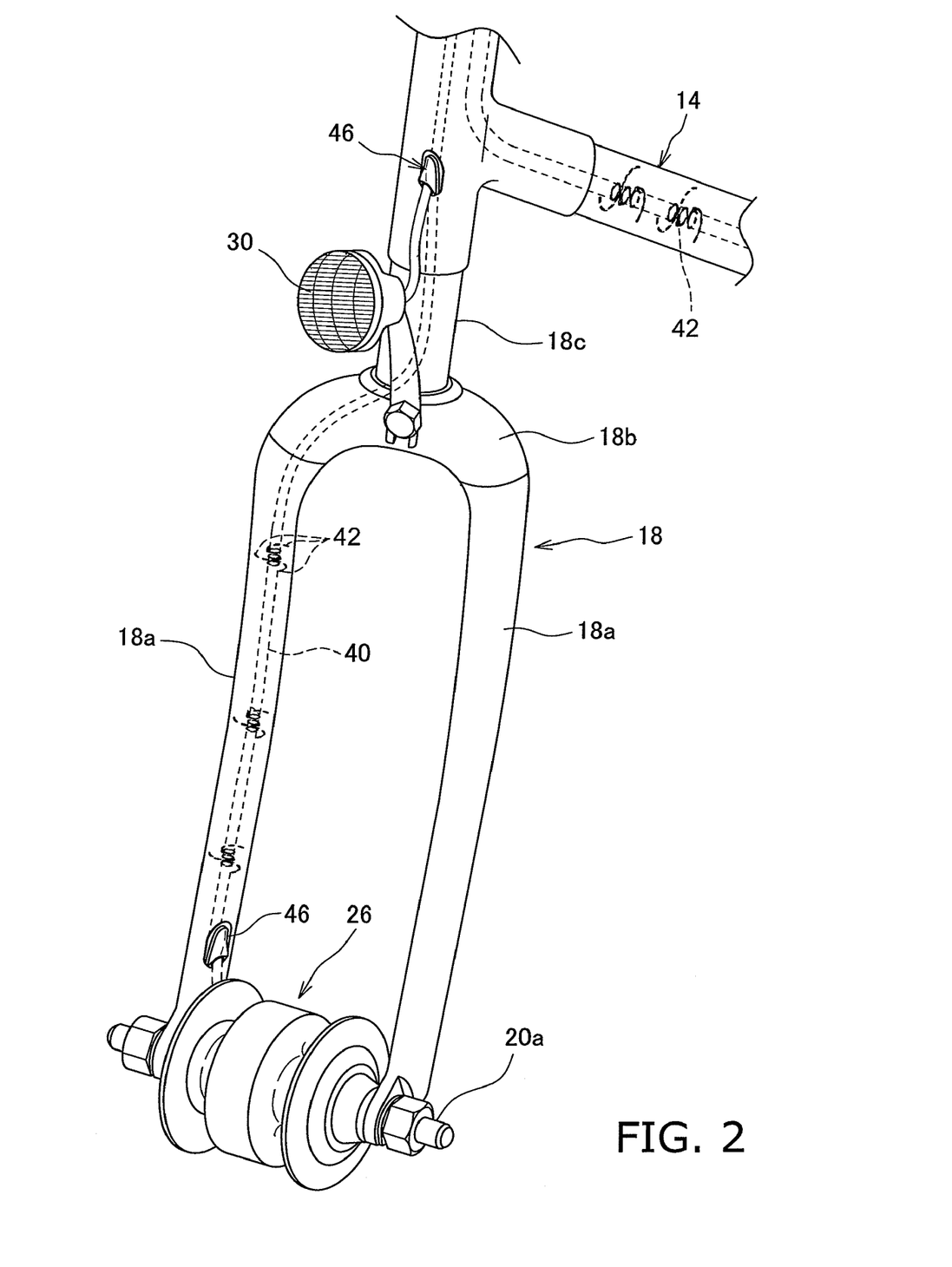
FIG. 2 is a front perspective view of the front fork of the bicycle illustrated in FIG. 1 showing a portion of the bicycle wire holding arrangement.
Figure 3:
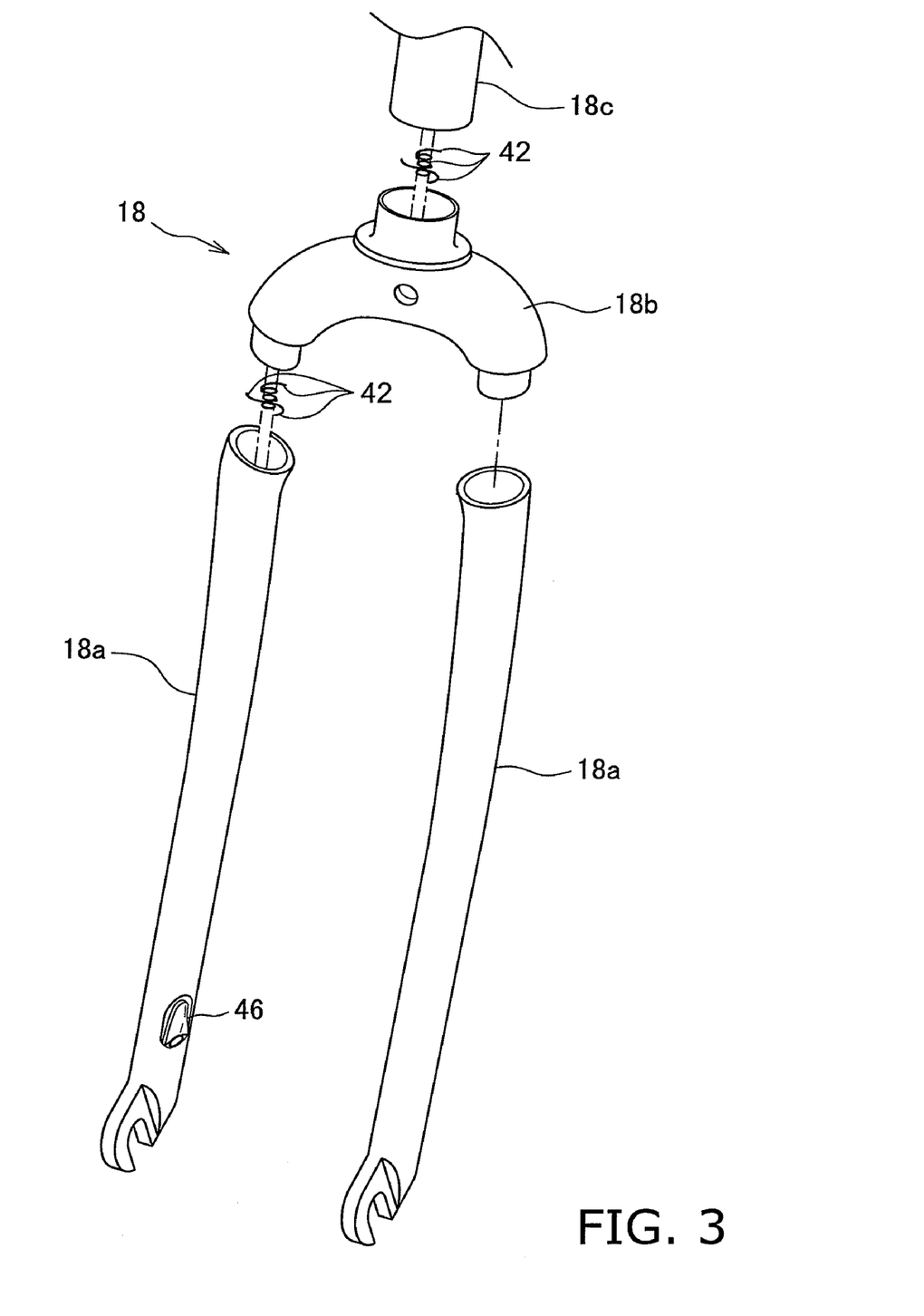
FIG. 3 is an exploded perspective view of the front fork illustrated in FIG. 2 showing a portion of the bicycle wire holding arrangement.
Figure 4:
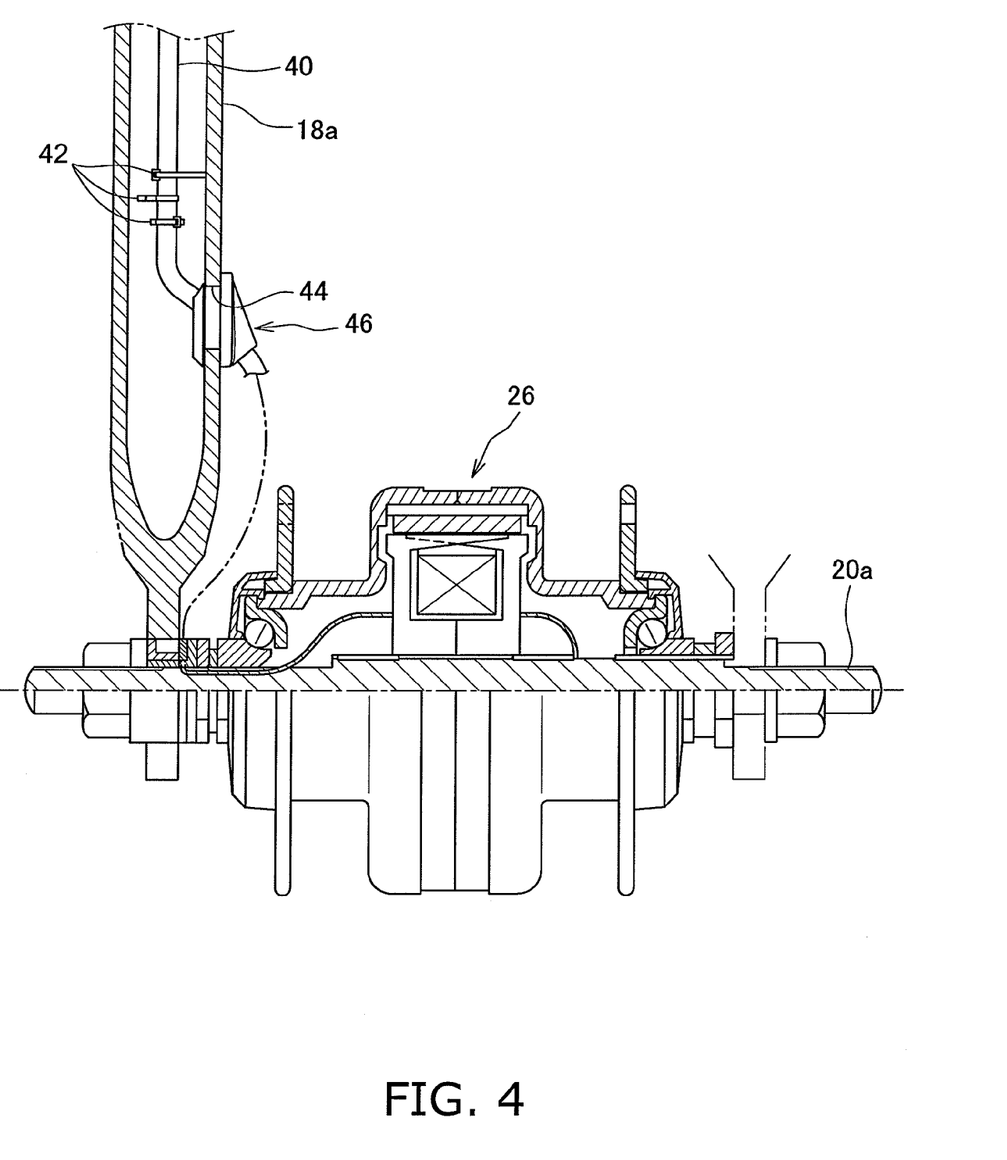
FIG. 4 is a partial longitudinal cross sectional view of the front hub and the lower section of the front fork illustrated in FIG. 2 showing a portion of the bicycle wire holding arrangement.
Figure 7:
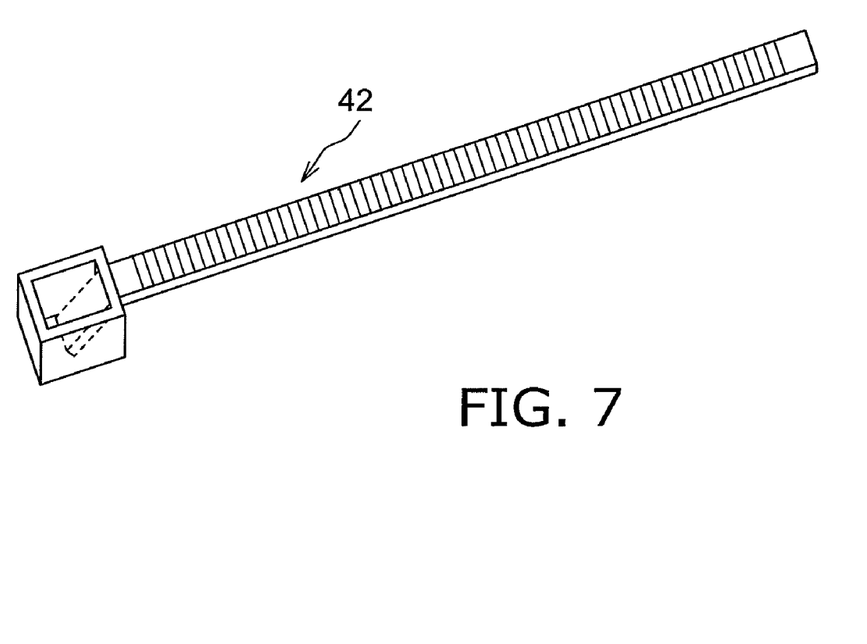
FIG. 7 is a perspective view of one of the cable (zip) ties that constitutes a suspending member of the bicycle wire holding arrangement.
Figure 8:
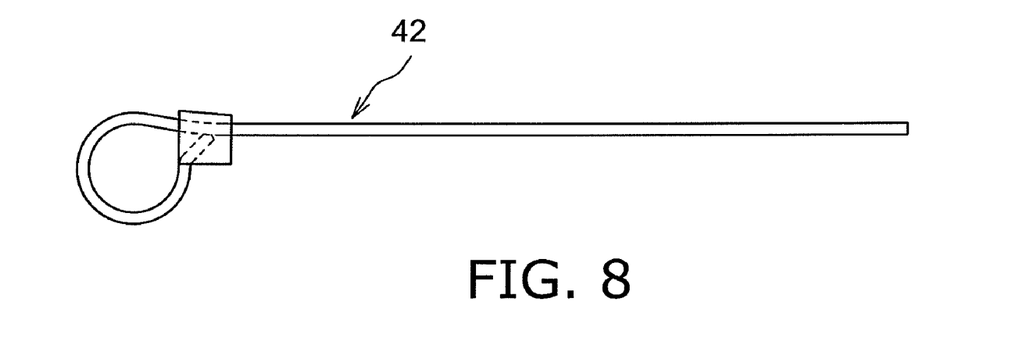
FIG. 8 is an edge elevational view of one of the cable (zip) ties arranged in a wire holding configuration.

As seen in FIGS. 2 and 3, the electrical wiring harness 40 has several portions that branch off to connect with a corresponding one of the bicycle components 26, 28, 30, 32, 34, 36 and 38. The portions of the electrical wiring harness 40 are supported inside of the frame 14, the handlebar 16 and the front fork 18 by a plurality of cable (zip) ties 42 that constitute a suspending member. Basically, each of the frame 14, the handlebar 16 and the front fork 18 constitutes a hollow frame member that forms a part of the bicycle wire holding arrangement 12. Thus, as seen in FIG. 2, the bicycle wire holding arrangement 12 basically includes a hollow frame member (e.g., a portion of the frame 14, the handlebar 16 or the front fork 18), a wire (e.g., a portion of the electrical wiring harness 40), and a suspending member (e.g., one or more of the cable ties 42). The cable ties 42 are conventional plastic cable ties as best seen in FIGS. 7 and 8. The cable ties 42 constitute a suspending member that is a resilient element for applying a biasing force against the interior surface of a portion of the frame 14 (the hollow frame member) to hold a portion of the electrical wiring harness 40 (the wire) away from the interior surface of the portion of the frame 14. The fork stem 18c has a hole (not shown) so that the electrical wiring harness 40 can pass through the fork stem 18c. Also since the precise construction of the front end portion of the frame 14 can vary depending on the particular bicycle, a detail construction of the front end portion of the frame 14 (i.e., where the electrical wiring harness 40 passes through the fork stem 18c) is not shown.

Preferably, as seen in FIGS. 2 to 4, 10 and 11, the frame 14 and the front fork 18 are each provided with one or more access openings 44 (e.g., FIGS. 4 and 10) for the electrical wiring harness 40 to enter and exit the frame 14 and the front fork 18. The space between the electrical wiring harness 40 and the access opening 44 is sealed a grommet or cap 46. This cap 46 is press fitted in to the access opening 44.

As seen in FIGS. 15 to 20, this cap 46 includes an exterior portion 50, an interior portion 52 and a connecting portion 54 extending between the exterior portion 50 and the interior portion 52. The connecting portion 54 is recessed from the exterior portion 50 and the interior portion 52 to form an annular groove 56 that receives an edge of frame 14 or the front fork 18 that forms the access opening 44. The cap 46 also includes a wire receiving hole 58. The interior portion 52 is asymmetric with respect to the exterior portion 50 and the access opening 44. Thus, the interior portion 52 has a ledge 52a that is larger where the electrical wiring harness 40 exits the exterior portion 50. This configuration of the cap 46 makes it more difficult to remove the cap 46 in the direction that the electrical wiring harness 40 exits the wire receiving hole 58.

Figure 5:
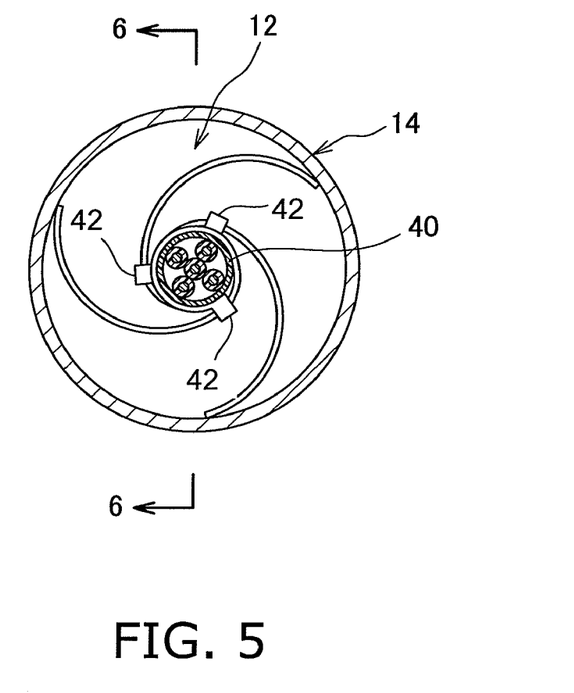
FIG. 5 is a transverse cross-sectional view of a hollow frame member (down tube) of the bicycle frame as seen along section line 5-5 in FIG. 2.
Figure 6:
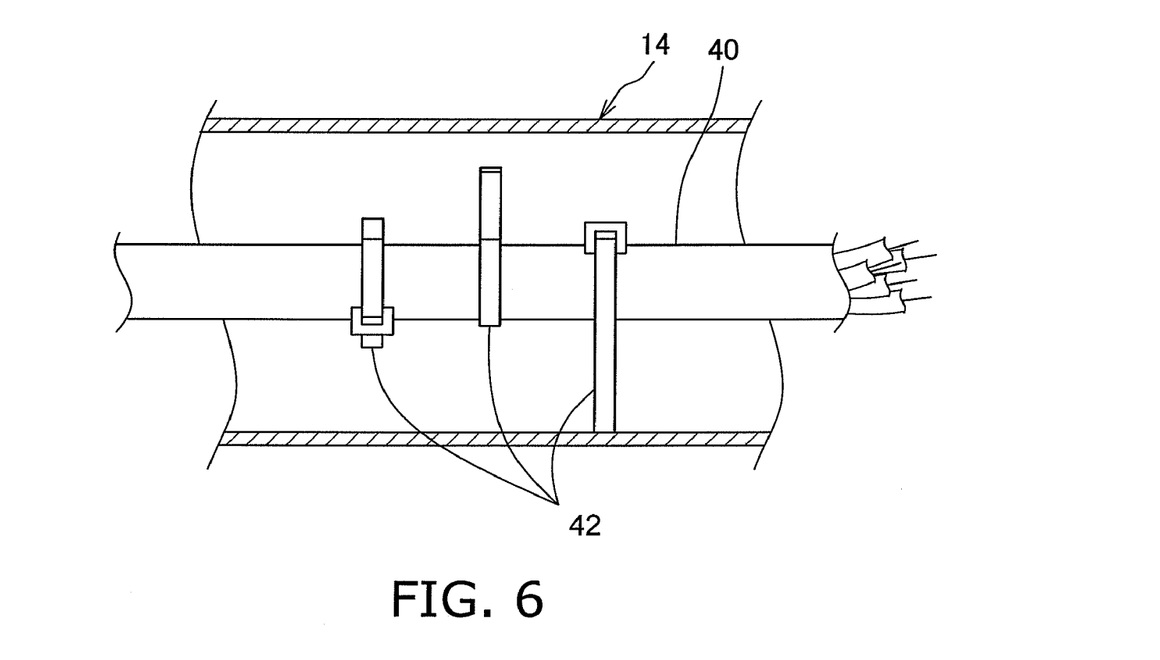
FIG. 6 is a longitudinal cross-sectional view of the hollow frame member (down tube) of the bicycle frame as seen along section line 6-6 in FIG. 5.

Preferably, as best seen in FIGS. 5 and 6, the electrical wiring harness 40 extends axially inside the hollow frame member (e.g., a portion of the frame 14) such that the electrical wiring harness 40 is held approximately in the center of the hollow frame member (e.g., a portion of the frame 14) by the cable ties 42 (e.g., the suspending member). The cable ties 42 (e.g., the suspending member) are coupled to at one end to the electrical wiring harness 40, while the other (free) end contacts an interior surface of the hollow frame member (e.g., a portion of the frame 14) to hold the electrical wiring harness 40 away from the interior surface of the hollow frame member. In this way, an annular space (360°) is formed around the electrical wiring harness 40 so that that the electrical wiring harness 40 does not hit the interior surface of the hollow frame member (e.g., a portion of the frame 14). In other words, in this illustrated embodiment, the cable ties 42 are arranged to hold the electrical wiring harness 40 (e.g., the wire) closer to a center axis of the hollow frame member (e.g., a portion of the frame 14) than an interior surface of the hollow frame member (e.g., a portion of the frame 14).

Figure 9:
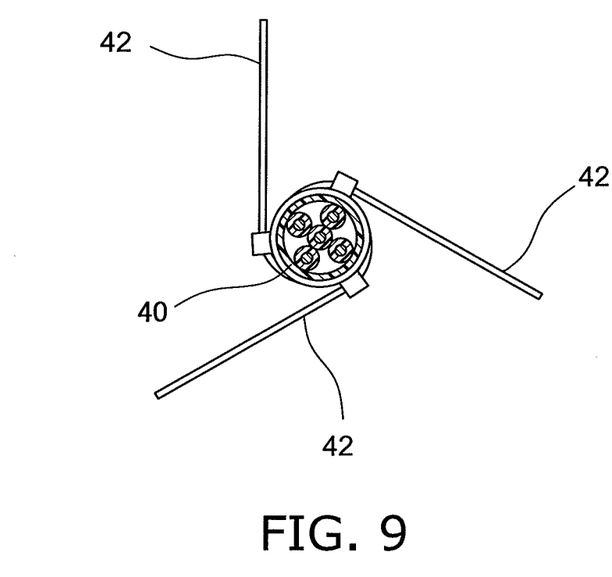
FIG. 9 is an end elevational view of one of the electrical cords (wires) with three of cable (zip) ties attached thereto and prior to insertion into a hollow frame member of the bicycle frame.
Figure 10:
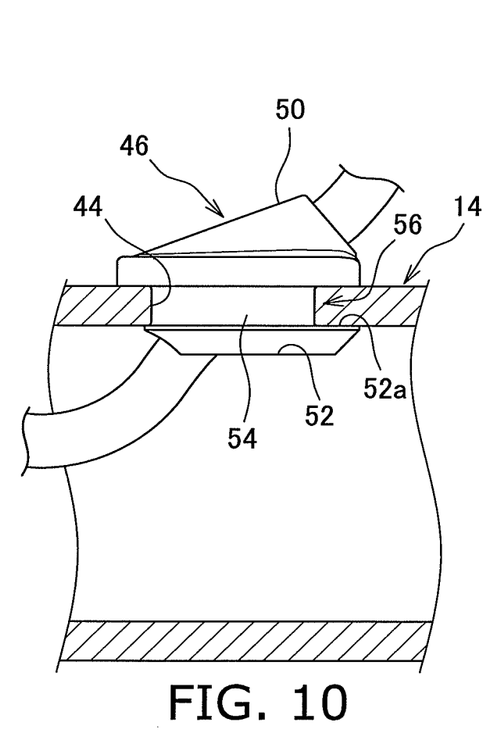
FIG. 10 is a longitudinal cross-sectional view of a hollow frame member of the bicycle frame where the electrical cord exits the hollow frame member through a grommet or cap.
Figure 11:
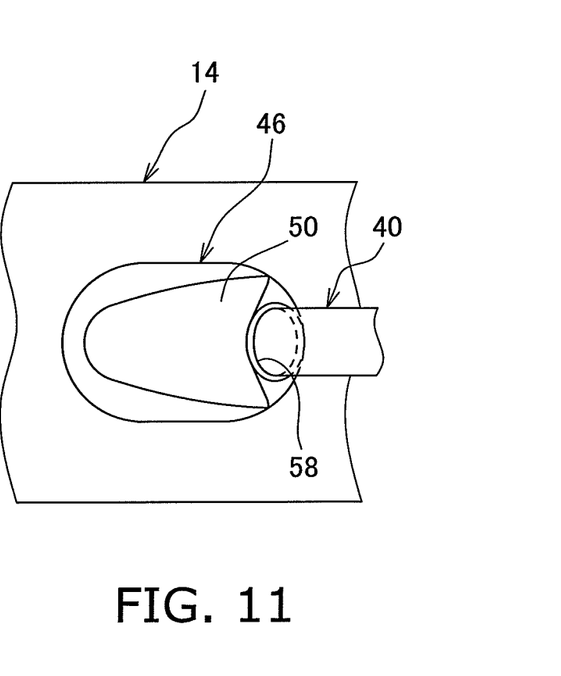
FIG. 11 is an top plan view of one of the portion of the hollow frame member illustrated in FIG. 10 where the electrical cord exits the hollow frame member through the cap.

Preferably, the cable ties 42 are arranged in groups of three with each grouping of three cable ties being spaced axially along the electrical wiring harness 40. In each of three cable ties, the cable ties 42 are attached to the electrical wiring harness 40 so that the free ends of the cable ties 42 are spaced 120° apart as seen in FIG. 9. When the electrical wiring harness 40 is installed in the hollow frame member (e.g., a portion of the frame 14), the free ends of the cable ties 42 in each group contacting the interior surface of the hollow frame member (e.g., a portion of the frame 14) at circumferentially spaced apart points. Of course, fewer or more cable ties 42 can be used as needed and/or desired. Preferably, the cable ties 42 are each constructed of a flexible plastic material with a certain degree of resiliency such that the other (free) end contacts an interior surface of the hollow frame member (e.g., a portion of the frame 14). In other words, due to the resiliency of the cable ties 42, the free ends of the cable ties 42 contact the interior surface of the hollow frame member (e.g., a portion of the frame 14) so as to form a spring element between the interior surface of the hollow frame member and the electrical wiring harness 40 at each of the cable ties 42. Thus, effectively, the electrical wiring harness 40 is supported by three spring elements (e.g., the cable ties 42). In this way, the electrical wiring harness 40 is prevented (or at least minimized) from contacting the interior surface of the hollow frame member (e.g., a portion of the frame 14) even when the bicycle 10 is traveling over rough terrain.

Second Embodiment

Figure 12:
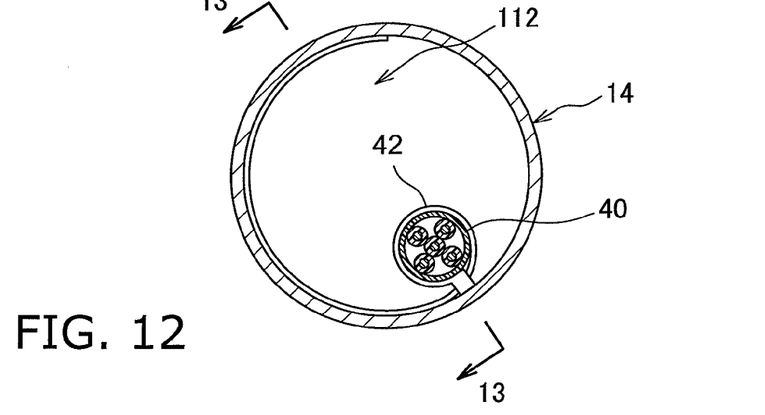
FIG. 12 is a transverse cross-sectional view, similar to FIG. 5, of a hollow frame member (down tube) of the bicycle frame, but in which a bicycle wire holding arrangement is used in accordance with a second embodiment.
Figure 13:
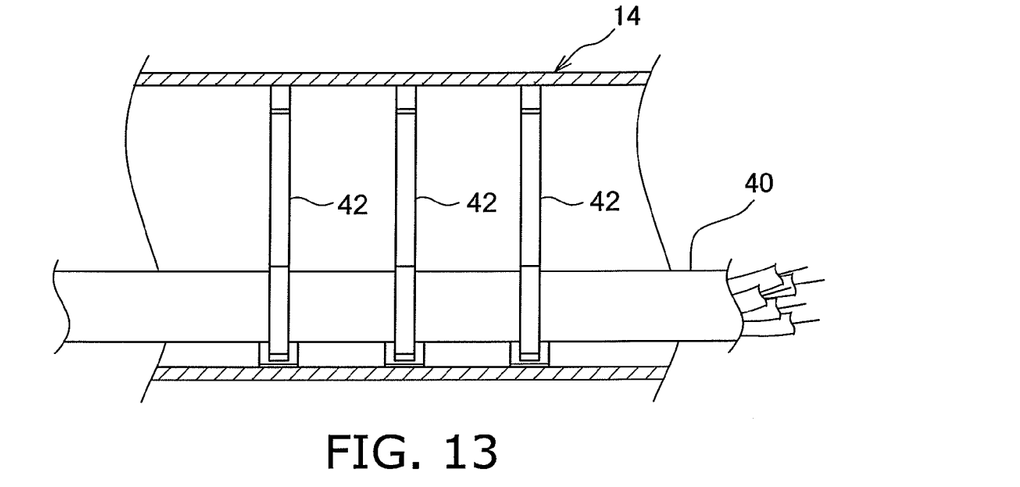
FIG. 13 is a longitudinal cross-sectional view of the hollow frame member (down tube) of the bicycle frame as seen along section line 13-13 in FIG. 12.
Figure 14:
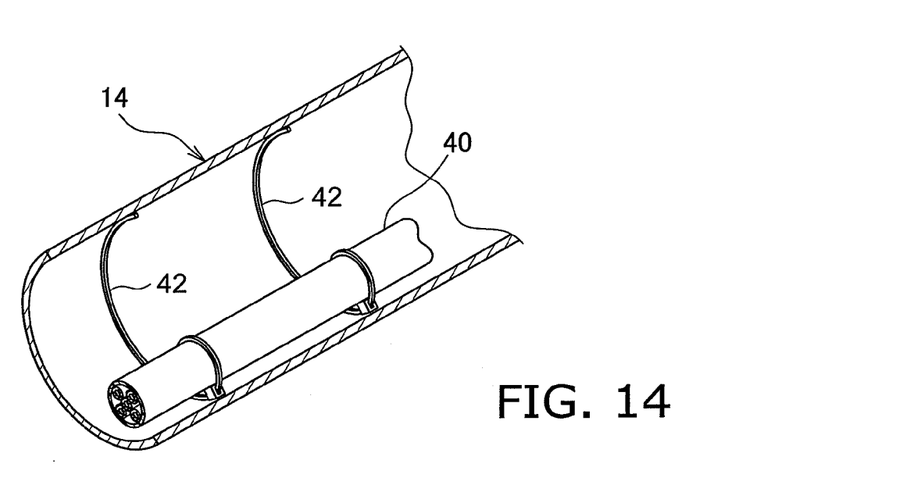
FIG. 14 is a perspective longitudinal cross-sectional view of the hollow frame member (down tube) of the bicycle frame shown in FIG. 12.
Figure 15:
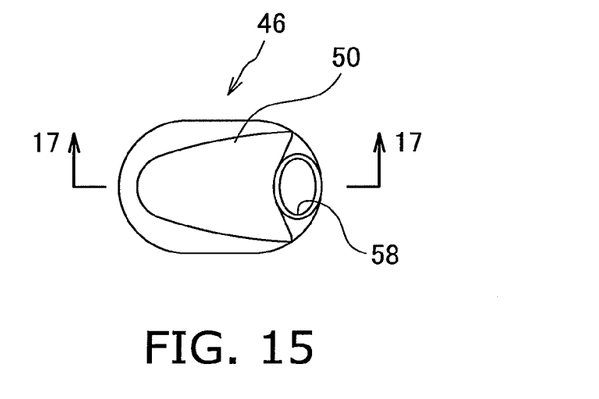
FIG. 15 is an top plan view of the cap.
Figure 16:
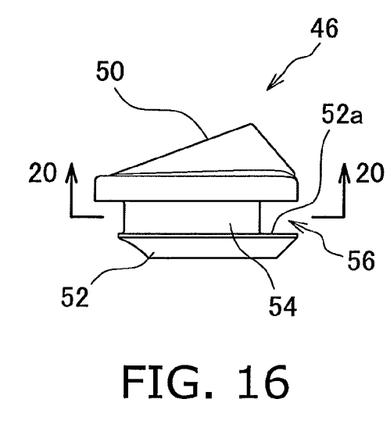
FIG. 16 is a side elevational view of the cap illustrated in FIG. 15.
Figure 17:
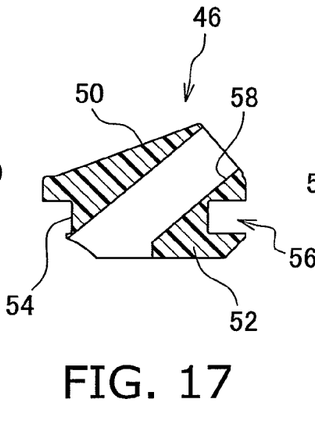
FIG. 17 is a cross-sectional view of the cap as seen along section line 17-17 in FIG. 15.
Figure 18:
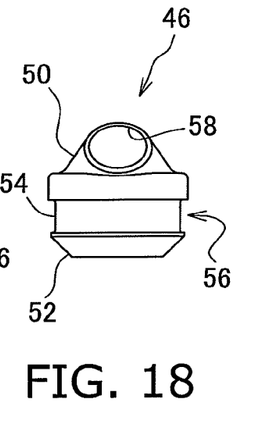
FIG. 18 is an end elevational view of the cap illustrated in FIGS. 15 to 17.
Figure 19:
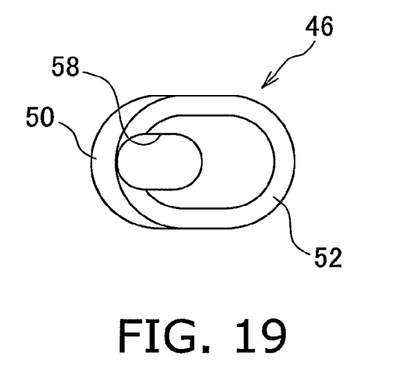
FIG. 19 is a bottom plan view of the cap illustrated in FIGS. 15 to 18.
Figure 20:
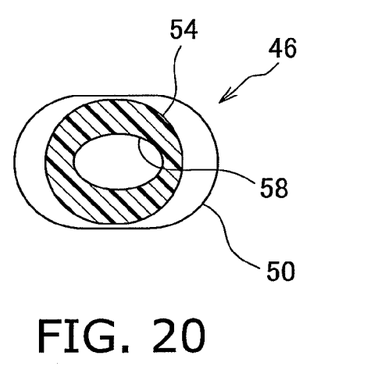
FIG. 20 is a cross-sectional view of the cap as seen along section line 20-20 in FIG. 16.

Referring now to FIGS. 12 to 14, a bicycle wire holding arrangement 112 is illustrated in accordance with a second embodiment. The bicycle wire holding arrangement 112 is used in the bicycle of FIG. 1 for supporting the electrical wiring harness 40 to prevent (or at least minimize) the electrical wiring harness 40 from contacting the interior surface of the hollow frame member (e.g., a portion of the frame 14) even when the bicycle 10 is traveling over rough terrain. In the bicycle wire holding arrangement 112, the cable ties 42 are arranged to hold the electrical wiring harness 40 (e.g., the wire) closer to an interior surface of the hollow frame member (e.g., a portion of the frame 14) than a center axis of the hollow frame member (e.g., a portion of the frame 14).

In view of the similarity between the first and second embodiments, the parts of the second embodiment that are identical to the parts of the first embodiment will be given the same reference numerals as the parts of the first embodiment. Moreover, a detail descriptions of the parts of the second embodiment have be omitted for the sake of brevity.

As seen in FIGS. 12 to 14, a single one of the cable ties 42 is attached to the electrical wiring harness 40 at a plurality of locations along the electrical wiring harness 40. The axial spacing between the cable ties 42 can be the same or different as needed and/or desired closer to an interior surface of the hollow frame member (e.g., a portion of the frame 14). Since the cable ties 42 are spaced apart along the electrical wiring harness 40, the cable ties 42 firmly hold the electrical wiring harness 40 next to the interior surface of the hollow frame member (e.g., a portion of the frame 14). In other words, due to the resiliency of the cable ties 42, the free ends of the cable ties 42 contact the interior surface of the hollow frame member (e.g., a portion of the frame 14) so as to form a spring element between the interior surface of the hollow frame member and the electrical wiring harness 40 at each of the cable ties 42.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle wire holding arrangement comprising:
   a hollow frame member;
   a wire extending axially inside the hollow frame member; and
   a suspending member disposed inside the hollow frame member, the suspending member being coupled to the wire and contacting an interior surface of the hollow frame member to hold the wire, the suspending member including at least one cable tie that is an elongated member having a wire attachment end and a free end spaced from the wire attachment end and from the wire, with the free end contacting the interior surface of the hollow frame member.

2. The bicycle wire holding arrangement according to claim 1, wherein
   the at least one cable tie is constructed of a flexible plastic material.

3. The bicycle wire holding arrangement according to claim 1, wherein
   the suspending member includes a plurality of cable ties that are spaced apart along the wire inside the hollow frame member.

4. The bicycle wire holding arrangement according to claim 3, wherein
the cable ties are arranged to hold the wire closer to a center axis of the hollow frame member than an interior surface of the hollow frame member.

5. A bicycle wire holding arrangement comprising:
a hollow frame member;
a wire extending axially inside the hollow frame member; and
a suspending member disposed inside the hollow frame member, the suspending member being coupled to the wire and contacting an interior surface of the hollow frame member to hold the wire,
the suspending member including a plurality of cable ties that are spaced apart along the wire inside the hollow frame member,
the cable ties being arranged to hold the wire closer to a center axis of the hollow frame member than the interior surface of the hollow frame member, and
the cable ties being arranged in groups of three with free ends of the cable ties in each group contacting the interior surface of the hollow frame member at circumferentially spaced apart points.

6. A bicycle wire holding arrangement comprising:
a hollow frame member;
a wire extending axially inside the hollow frame member; and
a suspending member disposed inside the hollow frame member, the suspending member being coupled to the wire and contacting an interior surface of the hollow frame member to hold the wire,
the suspending member including a plurality of cable ties that are spaced apart along the wire inside the hollow frame member,
the cable ties being arranged to hold the wire closer to an interior surface of the hollow frame member than a center axis of the hollow frame member.

7. The bicycle wire holding arrangement according to claim 1, wherein
the at least one cable tie is a resilient element that applies a biasing force against the interior surface of the hollow frame member to hold the wire.

8. The bicycle wire holding arrangement according to claim 1, wherein
the hollow frame member has an access opening with a cap disposed in the access opening and the wire passing through the cap.

9. A bicycle wire holding arrangement comprising:
a hollow frame member;
a wire extending axially inside the hollow frame member; and
a suspending member disposed inside the hollow frame member, the suspending member being coupled to the wire and contacting an interior surface of the hollow frame member to hold the wire,
the hollow frame member having an access opening with a cap disposed in the access opening and the wire passing through the cap,
the cap including an exterior portion, an interior portion and a connecting portion extending between the exterior portion and the interior portion, with the connecting portion being recessed from the exterior and interior portions to form an annular groove that receives an edge of the hollow frame member that forms the access opening, and the interior portion being asymmetric with respect to the exterior portion and the access opening.

\* \* \* \* \*